United States Patent [19]

Lüthi

[11] Patent Number: 4,679,332

[45] Date of Patent: Jul. 14, 1987

[54] SENSOR DEVICE FOR A MACHINE FOR MEASURING CONDUCTIVE PARTS MOUNTED ON A MEASUREMENT TABLE

[75] Inventor: Walter Lüthi, Ebnat-Kappel, Switzerland

[73] Assignee: Tesa S.A., Renens, Switzerland

[21] Appl. No.: 910,131

[22] Filed: Sep. 22, 1986

[30] Foreign Application Priority Data

Oct. 14, 1985 [CH] Switzerland .................. 04415/85

[51] Int. Cl.⁴ ............................................. G01B 7/28
[52] U.S. Cl. ................................ 33/559; 33/169 R; 33/172 E
[58] Field of Search ............ 33/1 M, 23.11, 558–561, 33/556, 572, 503, 504, 169 R, 169 C, 172 E

[56] References Cited

U.S. PATENT DOCUMENTS 2,090,178 8/1937 Brickner ........................ 33/169 C
4,443,946 4/1984 McMurtry .................... 33/169 R X
4,547,772 10/1985 Ernst .............................. 33/501 X Primary Examiner—Harry N. Haroian
Attorney, Agent, or Firm—Anthony J. Casella; Gerald E. Hespos

[57] ABSTRACT

The device comprises a sensor (2) which is connected to a movable housing (1) by an elastically deformable mechanism (4).

The sensor and the housing are connected to an electric circuit (5) comprising:

a capacitive amplifier producing a measurement pulse constituting a datum for a computer and an order for the stopping of the displacement of the sensor when the latter comes into contact with a part to be measured which is mounted in insulated fashion on a measurement table, a short-circuiting device (17-18) producing a safety pulse which constitute an order for the stopping of this displacement in the event of deformation of the mechanism (4) as a result of the non-issuance of the measurement pulse.

A measurement is thus taken with full safety without deformation of the linking mechanism and without the part to be measured having to be connected to the electric circuit.

5 Claims, 2 Drawing Figures

U.S. Patent   Jul. 14, 1987   4,679,332
FIG. – 1 –
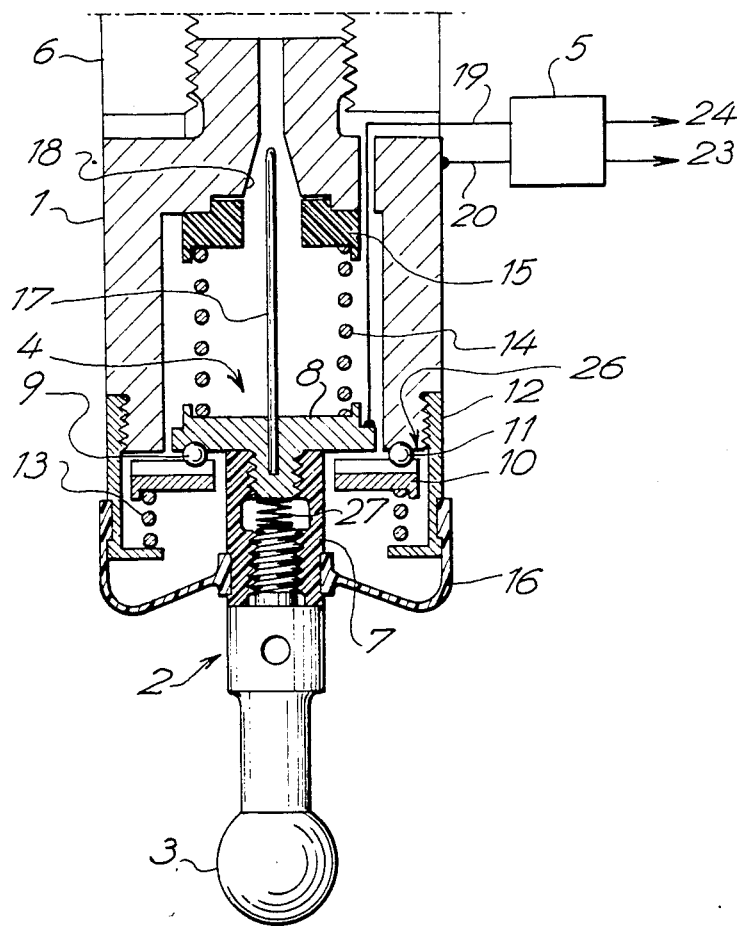
FIG. – 2 –
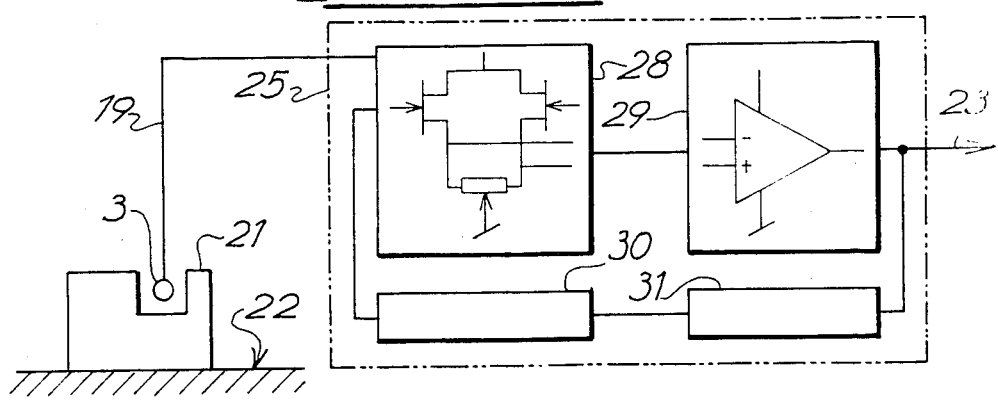

SENSOR DEVICE FOR A MACHINE FOR MEASURING CONDUCTIVE PARTS MOUNTED ON A MEASUREMENT TABLE

The object of the present invention is a sensor device for a machine for measuring conductive parts mounted on a measurement table and comprising a housing intended to be fastened to a movable support of the machine, a measurement tip sensor integral with the housing and intended to sense a part to be measured by displacement of the movable support, a mechanism for the three-dimensional linking of the sensor to the housing and capable of being deformed elastically when a given pressure of the tip of the sensor against the part to be measured is exceeded, and an electric circuit influenced by contact of the tip of the sensor against the part to be measured so as to produce an electric pulse.

This sensing device is intended to be used more particularly, but not exclusively, on machines for the three-dimensional measurement of mechanical parts which are being machined or have been machined, by reference to three rectangular coordinate axes.

On these machines, the relative position of the housing of the sensing device to which the measurement tip sensor is connected is detected by detectors with reference to the three coordinate axes and calculated by a computer. Upon contact of the tip of the sensor with an element of a part to be measured which is mounted on the measurement table, the pulse produced by the electric circuit constitutes an acquisition of data for the computer which makes it possible to memorize the relative position of the housing reached at that moment, said position being used for the initialization or stopping of the counting of the measurement to be effected in accordance with the measurement process applied.

The mechanism for the three-dimensional linking of the sensor to the housing is capable of being deformed elastically so as to permit the sensor to move to a certain extent under the effect of a given pressure with respect to the housing upon the impact of the measurement tip against the part to be measured. This feature is provided in order to avoid deformation or mechanical breakage as the result of a lag in the stopping of the displacement of the housing upon said impact.

The electric measurement pulse is produced in various ways depending on the type of these machines and also serves on some of such machines automatically to interrupt the displacement of the support of the housing when the latter is remote controlled.

On a measurement machine described in published French Patent Application No. 2,303,267, the measurement tip is fastened to a tube mounted in elastically movable fashion in the body of the sensor by means of a bearing device consisting of a flat, annular, spring blade firmly anchored at its inner edge to the tube of the measurement tip and at its outer edge to the body of the sensor.

The end of the tube opposite the measurement tip cooperates with the actuating finger of a microswitch so as to actuate the switch and produce the electric measurement pulse upon the slightest displacement of the tube caused by the measurement tip coming against the object to be measured. In the case of excessive displacements resulting from a possible lag in the stopping of the displacement of the movable housing, the tube comes against the inside of the body of the sensor and the linkage mechanism which elastically connects the sensor to the movable housing plays its part as safety device.

This sensing device is of interest in view of the simple design of the bearing device which constitutes, in a single elastic element, a spherical bearing which permits pivoting movements of the rod of the measurement tip in the entire three coordinate axis measurement system. However, in order to assure the precision and reliability of such a device, the stiffness of the annular spring blade must be less than the stiffness of the elastic return of the linkage mechanism and greater than that of the microswitch. The conformation of cooperation between the finger of the microswitch and the end of the tube which actuates it requires very great precision in its production, it being necessary to provide a minimum clearance between these two elements both in order to limit the inactive relative stroke thereof and to avoid the transmission of oscillations due to possible jarring of the housing and/or of the sensor as a result of the stopping of the displacement of the housing or other disturbing phenomena.

As a result hereof the reliability of such a device is dependent on very fine adjustments and a delicate construction the complex nature of which scarcely lends itself to the miniaturization which is being more and more sought in this field. Furthermore, while, in itself, the precision is good the degree of precision of the measurements effected is, on the other hand, impaired by the fact that the initializing and stopping of the measurement counting are triggered by the electric measurement pulse only as the result of a deformation, as small as it may be, of the bearing system which three-dimensionally links the measurement tip to the body of the sensor, the amplitude of which deformation is not necessarily repetitive so that it is impossible to quantify it reliably so as to constitute a correction datum for the computer.

In another known sensing device, described in U.S. Pat. No. 3,945,124, the tip of the sensor is connected to the housing via a bearing device formed by the combination of elastically deformable parallelograms arranged along the three directions of the three reference coordinate axes, and deformation detectors are associated with each of them so as to produce a measurement signal indicative of the measurement tip coming into contact with the part to be measured. Due to its complexity, this device has the same drawback as the previous one with respect to the present trend towards miniaturization and the degree of precision of the measurements effected is, in this case also, impaired by the fact that a measurement signal is produced only as a result of a deformation of one or the other of the deformable parallelograms of the bearing device.

In another known sensing device, described in Swiss Pat. No. 599,534, the tip of the sensor is connected to a source of electric current in such a manner that at the precise moment that it comes into contact with the conductive part to be measured the supply circuit is closed and produces a signal indicating this making of contact. In this way, the measurement pulse is produced here without requiring the slightest relative displacement between the sensor and the movable housing, contrary to the two known sensor devices which have been described above, and this is advantageous in the search for high precision. This device also lends itself advantageously to miniaturization in view of its simplicity.

However, the procedure of creating the measurement signal by the closing of an electric feed circuit requires that the conductive part to be measured be connected by cable to one of the terminals of said circuit. This connection by cable is unreliable and constitutes a considerable disturbance in the carrying out of the process of auscultation of the part to be measured during which it is, at times, necessary to move around said part. Furthermore, in the case of the interposition of an impurity between the measurement tip and the part to be measured, or else also in case the measurement tip comes into contact with an insulated part or insulating element of the part, no measurement signal is produced. In these cases excessive displacement of the movable housing may result, which would have the effect of damaging the sensing device by exceeding the safe elastic stroke of the linking device.

The object of the present invention is to provide a sensing device of the type described at the beginning hereof which is simple and reliable, of great precision, lends itself to miniaturization and is without the drawbacks pointed out above.

For this purpose, the sensing device of the invention is characterized by the fact that the electric circuit comprises a capacitive amplifier which is connected to the tip of the sensor so as to precharge it to a given voltage and has electronic means sensitive to a displacement of charge between the tip of the sensor and the part to be measured so as to produce an electric measurement pulse which is indicative of the entrance of the tip of the sensor into contact with the part to be measured, insulation of the part to be measured from the measurement table, and a safety system sensitive to the elastic deformation of the linking mechanism in order to produce an electric safety pulse indicative of a possible elastic deformation of said mechanism.

In this way, the creation of the electric measurement pulse is not dependent on a mechanism which is bulky and difficult to adjust nor does it require connection by cable of the part to be measured since this pulse is produced by a capacitive amplifier which is capable of detecting any displacement of charge between the measurement tip and the part to be measured which is mounted in insulated manner on the measurement table, by means of a simple connection of said tip to said amplifier. Thus the measurement pulse is produced at the precise moment that the tip of the sensor makes contact with the part to be measured, prior to any relative displacement of the sensor with respect to the housing, as is already known from the above-cited Swiss patent but in this case without the drawback of the necessity of a connection by cable of the part to be measured.

Furthermore, as the three-dimensional linkage mechanism which connects the sensor to the housing does not collaborate in the creation of the measurement pulse by its elastic deformation, it can therefore be of great simplicity and with large elastic movement, which is, in particular, very advantageous in the application of the sensor device to three-dimensional measurement. The electric safety pulse produced here by this elastic deformation can be used either as alarm signal for the operator who thus knows that the measurement signal has not taken place because the measurement tip has come against an impurity or an insulating portion of the part to be measured, or as signal for producing the automatic stopping of the displacement of the movable support when said displacement is remote-controlled. Another advantage resides in the fact that it is possible to use both the measurement pulse and the safety pulse in order automatically to stop this displacement. In fact, the use of the measurement pulse to provide both data acquisition for the computer of the machine and a signal for causing the automatic stopping of the support of the housing constitutes a considerable saving in energy due to the capacitive system employed, the second safety pulse acting then in the event that a measurement pulse is not produced and for only a large amplitude of the elastic deformation of the linking mechanism.

In one embodiment which is advantageous because of its simplicity and reliability, the capacitive amplifier comprises a differential field-effect sensor device mounted in offset balance and connected to the inputs of an operational amplifier in order to detect the displacement of charge from the tip of the feeler towards the part to be measured by switching the potential at the said inputs.

This embodiment of the capacitive amplifier also makes it possible by an adaptation which is also simple, to guard against any erroneous measurement signal which might be due to mechanical oscillations of the sensor or of the support as a result of the braking of the displacement of said support or else vibrations of the measuring machine itself. For this purpose, one input of the differential field-effect sensor device is connected to a device for the discharge and adjustment of the charge voltage of the tip of the sensor which is controlled by a logic device in order electrically to discharge the tip of the sensor and the part to be measured immediately upon the displacement of charge detected by the sensor device and to recharge the said tip to the given voltage upon its breaking of contact with the part to be measured in accordance with a given time constant. In this way, assurance is had that the sensor is recharged slowly to the desired voltage without simultaneously giving off an additional signal as a result of a parasitic oscillation which takes place after the initial emission of the measurement pulse.

In order to produce the safety electric pulse which is indicative of an elastic deformation of the mechanism linking the sensor to the housing, any traditional system can be used, but the fact that this mechanism does not participate in the creation of the measurement signal and that the sensor is connected to an electric circuit permits a particularly simple embodiment here which is characterized by the fact that the tip of the sensor is insulated from the housing, that the latter is connected to one terminal of the electric circuit and that the safety arrangement comprises an elastic feeler fastened to the sensor in such a manner as to be driven by the latter upon elastic deformation of the linking mechanism so as to produce a short-circuit signal by contact with the housing. In this way the connecting mechanism plays the role of a return mechanism of a switch and it is not necessary to install any additional device in order to produce such a signal.

In one embodiment which is also simple and takes up minimum space so as to be of interest for the miniaturizing of the safety arrangement and furthermore lends itself well to a machine for three-dimensional measurement, this arrangement comprises a feeler formed by a flexible rod which extends with given radial play into a borehole in the housing. In this way, the sensor operates as the button of a switch which functions in any position, horizontal or vertical. By utilizing the differences in diameters between this flexible wire and this borehole, the movement of the linking mechanism necessary for the production of the short-circuit signal can be determined in the most optimally simple manner.

The accompanying drawing shows, by way of example, one embodiment of the object of the invention which is suitable for a machine for three-dimensional measurement.

FIG. 1 is a diagrammatic axial cross section.

FIG. 2 is a functional diagram of a characteristic part of its electric circuit.

The sensing device shown in FIG. 1 comprises, as a whole, a housing 1, a sensor 2 which has a measurement tip 3 and is rigidly attached to the housing 1, a mechanism 4 for the three-dimensional linking of the sensor 2 to the housing 1, and an electric circuit 5.

The housing 1 is intended to be fastened to a movable support 6 attached to the arm or the gantry of a measuring machine (not shown) in such a manner that a part to be measured can be sensed by the measurement tip 3 by displacement of the movable support 6 at least in the directions of the measurements to be effected.

The linking mechanism 4 is developed here as follows:

Within the housing 1, the sensor 2 is fastened via an insulating sleeve 7 to a first disk 8 of a three-ball bearing 9 of the so-called "Boys support type" centered on a second disk 10 of a second three-ball bearing 11 of the same type centered on a circular base 26 of the housing 1. A hood 12 screwed around said base 26 constitutes the abutment for a first compression spring 13 which holds the second disk 10 pressed, via its balls 11, against said base. Above this assembly a second compression spring 14, which rests against an insulating washer 15 interposed between it and the top of the housing 1, holds the first disk 8 pressed, via its balls 9 against the second disk 10. The first spring 13 is of greater stiffness than the second spring 14 so that this bearing assembly is immobilized in space with respect to the housing 1, these two springs being so calibrated that elastic deformation of this connecting mechanism takes place only if the permitted measurement pressure is exceeded by a given amount.

This arrangement is protected from outside influences by a rubber cuff 16.

Within the insulating sleeve 7 which acts here also as mechanical fuse in the event of a violent impact against the sensor 2, the latter is connected electrically to the first disk 8 by a compression spring 27 and this disk 8 has an elastic feeler 17 formed of a flexible conductive rod which extends with a certain predetermined radial clearance into a borehole 18 provided in the top of the housing 1.

The balls 9 and 11 of the bearing assembly are made of insulating material, for instance ruby, so that the sensor 2 which is thus connected mechanically to the housing 1 is insulated electrically from the housing as long as sufficient elastic deformation of the linking device to cause the feeler 17 to come into contact with the wall of the hole 18 is not produced.

By its system comprising two ball bearings and two opposing springs, the linkage device thus produced is elastically deformable in the six directions corresponding to the two directions of each of the three reference coordinate axes of a three-dimensional measuring machine.

The sensor 2 and the housing 1 of this sensing device are connected by two cables 19 and 20 to the electric circuit 5. This electric circuit, a characteristic part of which is shown in FIG. 2, is adapted to be actuated by contact of the measurement feeler 3 with a conductive part 21 to be measured which is mounted in electrically insulated fashion on a measurement table 22 so as to produce an electric measurement pulse indicating that said tip 3 has entered into contact with said part 21 via a first output 23 and to produce, via a second output 24, an electric safety pulse indicating possible elastic deformation of the connecting linkage 4.

In order to produce the electric measurement pulse the electric circuit 5 has a capacitive amplifer 25 (the operating diagram of which is shown in FIG. 2) connected by the cable 19 and then via the linking mechanism 4 to the tip 3 of the sensor 2.

This capacitive amplifier 25 is adapted to precharge the tip 3 of the sensor 2 to a given voltage, for instance 30 volts, and comprises electronic means which are sensitive to a displacement of charge between said tip and the part to be measured, said means being formed by:

a field-effect differential sensor device 28 connected in offset balance, formed, for instance, of a circuit comprising two field-effect transistors offset by a potentiometer, and an operational amplifier 29 whose two inputs are connected to the sensor device 28 and whose output 23 delivers the measurement pulse in question.

In this circuit, the field-effect differential sensor device 28 detects the movement of charge from the tip 3 of the sensor to the part to be measured 21 which takes place at the moment said two elements come into contact and causes the measurement pulse to be given off at that precise instant by the switching of the potential at the inputs of the operational amplifier 29.

In order to avoid possible erroneous signals which might be due, for instance, to vibrations resulting from the sudden stop of the displacement of the movable support 6 upon impact of the measurement tip 3 against the part to be measured 21, the capacitive amplifier 25 comprises, furthermore, connecting the output of the operational amplifier 29 to an input of the sensor device 28, a device 30 for the discharge and regulating of the charge voltage of the tip 3 of the sensor which is controlled by a logic 31. This discharge and regulating device 30 is controlled by the logic 31 so as to electrically discharge the tip of the sensor and the part to be measured immediately after the displacement of charge detected by the sensor device 28 and to progressively recharge said tip to the given voltage immediately upon the breaking of its contact with the part to be measured and in accordance with a given time constant.

The discharge and regulating device 30 may be formed, for instance, in simple fashion by a circuit comprising a transistor controlled by the logic so as to bring the input of the operational amplifier 29 to a low negative voltage and thus cause a discharge of the sensor and of the part to be measured to zero volt by negative feedback resistor upon the detection by a comparator of the giving-off of the measurement pulse.

The sensor 2 and the part to be measured 21 being thus discharged electrically upon the first opening of contact between them and the charge rising then only gradually in accordance with a time constant, this time constant can be determined so as to make certain that any rapid remaking of contact as a result of a mechanical oscillation will not give an erroneous supplementary signal.

The greatest precision is thus assured in detecting the point of touch of the part to be measured.

In order to produce the electric safety pulse via its second output 24, the electric circuit 5 has elements which are sensitive to a short circuit, these elements being connected by the ground cable 20 to the housing 1 and by the feed cable 9 of the sensor to the feeler 17 through the first disk 8 of the connecting mechanism 4.

It is obvious that other means can be used to produce a safety signal which indicates elastic deformation of the linkage mechanism, such as, for instance, a displacement pick-up or else a switch the body of which is attached to the housing and the movable member of which is connected to a suitable element of the linkage mechanism. However, the manner of creating this signal by a short circuit utilizes here, in simple fashion and with a minimum number of means formed of the feeler 17 and the bore 18, the fact that the sensor 2 and the housing 1 are already connected by the two cables 19 and 20 to the two terminals of the electric circuit 5 in order to produce the measurement signal. This is advantageous both for extensive miniaturization and for the reliability of the device.

In addition to its destination towards the computer via the output 23 of the circuit 5, the measurement pulse is also directed to a device for ordering or controlling the stopping of the displacement of the sensor 2 (not shown) to which the safety pulse is furthermore also directed via the output 24.

Upon the taking of a measurement by contact of the tip 3 of the sensor 2 with the part to be measured 21, the measurement pulse produced by the capacitive amplifier thus supplies both data for the computer and an order to command for the stopping of the displacement of the sensing device. The braking process is, however, not instantaneous and the sensor 3 must still carry out a certain displacement until the complete stopping of the sensing device, and this displacement is taken into account here by the elastic deformation of the linkage mechanism 4 before the feeler 17 comes into contact with the wall of the hole 18, this being done by a suitable dimensioning of the axial clearance between these two elements. It is, in fact, advantageous, for reasons of economy of energy, not to use the safety pulse systematically to stop this displacement after the giving off of the measurement pulse.

If a measurement pulse is not produced, for instance due to the measurement tip 3 coming into contact with an impurity or an insulating element of the part 21 to be measured, the displacement of the sensor is then stopped by the short-circuit signal generated by the feeler 17 coming into contact with the bore 18, and no damage results for the sensing device unit.

The residual displacement caused by this delayed braking is taken into account in the determination of the amplitude of the free elastic displacement of the linkage mechanism 4 and of the elastic deformation of the feeler 17.

As a variant (not shown) of the electrical circuit 5, an electronic system can be provided to receive both the measurement signal and the safety signal, to distinguish between these two types of signals, and to give off corresponding pulses to the computer and to the braking device.

As a variant (also not shown) of the linkage mechanism 4, any other three-dimensional linkage system capable of being deformed elastically can be used, such as, for instance, those of the devices of the aforementioned documents 2,303,267 and 3,945,124, with the advantage over the latter that as great a precision in their production is no longer necessary since they no longer participate here in the creation of the measurement pulse but only in the creation of the safety pulse.

The embodiment given here as example of a three-dimensional measuring machine is obviously not limitative and the invention is also applicable with its advantages to machine tools or measuring machines measuring along only one or two reference coordinate axes. In these cases, the three-dimensional linking mechanism of the sensor to the housing can be differentiated, in the sense of simplification, by elimination of two or four degrees of freedom out of six in its elastic displacements.

I claim:

1. A sensor device for a machine for measuring conductive parts mounted on a measurement table and comprising a housing intended to be fastened to a movable support of the machine, a measurement tip sensor integral with the housing and intended to sense a part to be measured by displacement of the movable support, a mechanism for the three-dimensional linking of the sensor to the housing and capable of being deformed elastically when a given pressure of the tip of the sensor against the part to be measured is exceeded and an electric circuit influenced by contact of the tip of the sensor against the part to be measured so as to produce an electric pulse, characterized by the fact that the electric circuit (5) comprises a capacitive amplifier (25) which is connected to the tip (3) of the sensor (2) in order to precharge the latter to a given voltage and has electronic means (28, 29) sensitive to a displacement of charge between the tip of the sensor and the part to be measured so as to produce an electric measurement pulse which is indicative of the entrance into contact of the tip of the sensor with the part to be measured, an insulation of the part to be measured with respect to the measurement table, and a safety arrangement (17, 18) which is sensitive to the elastic deformation of the linkage mechanism so as to produce an electric safety pulse indicating a possible elastic deformation of said mechanism.

2. A device according to claim 1, characterized by the fact that said capacitive amplifier (25) comprises a differential field-effect sensor device (28) mounted in offset balance and connected to the inputs of an operational amplifier (29) to detect the displacement of charge from the tip of the sensor towards the part to be measured by switching the potential at the said inputs.

3. A device according to claim 2, characterized by the fact that one input of said differential field-effect sensor device (28) is connected to a device (30) for the discharge and adjustment of the charge voltage of the tip of the sensor which is piloted by a logic device (31) in order to electrically discharge the tip of the sensor and the part to be measured immediately after the displacement of charge detected by the field-effect sensor device and in order progressively to recharge said tip to said given voltage upon its breaking of contact with the part to be measured and in accordance with a given time constant.

4. A device according to claim 1, characterized by the fact that the tip (3) of the sensor (2) is insulated with respect to the housing (1), that the latter is connected to one pole of the electric circuit, and that the safety arrangement comprises an elastic feeler fastened to the sensor in such a manner as to be driven along by the latter upon an elastic deformation of the linkage mechanism so as to produce a short-circuit signal by contact with the housing.

5. A device according to claim 4, characterized by the fact that the elastic feeler (17) is formed by a flexible rod which extends with radial clearance into a borehole (18) in the housing.

* * * * *